(12) United States Patent
Miao (10) Patent No.: US 10,814,433 B2
(45) Date of Patent: Oct. 27, 2020

(54) LASER BASED SYSTEM FOR CUTTING TRANSPARENT AND SEMI-TRANSPARENT SUBSTRATES

(71) Applicant: VERTILED CO. LIMITED, Hong Kong (HK)

(72) Inventor: Cheng-Hsi Miao, Irvine, CA (US)

(73) Assignee: VERTILED CO. LIMITED, Hong Kong (HK)

( * ) Notice: Subject to any disclaimer, the term of this patent is extended or adjusted under 35 U.S.C. 154(b) by 0 days.

(21) Appl. No.: 16/691,583

(22) Filed: Nov. 21, 2019

(65) Prior Publication Data
US 2020/0147730 A1 May 14, 2020

Related U.S. Application Data

(63) Continuation of application No. PCT/CN2019/117717, filed on Nov. 12, 2019.
(Continued)

(51) Int. Cl.
*B23K 26/38* (2014.01)
*G02B 27/09* (2006.01)
(Continued)

(52) U.S. Cl.
CPC .......... *B23K 26/38* (2013.01); *B23K 26/0006* (2013.01); *B23K 26/0613* (2013.01);
(Continued)

(58) Field of Classification Search
CPC ............... B23K 26/38; B23K 26/0006; B23K 26/0613; B23K 26/0643; B23K 26/0648;
(Continued)

(56) References Cited

U.S. PATENT DOCUMENTS 7,804,043 B2 * 9/2010 Deshi .................... B23K 26/40
219/121.67
8,988,777 B2 * 3/2015 Kajikawa ........... B23K 26/0617
359/489.01
(Continued)

FOREIGN PATENT DOCUMENTS

CN 108161250 A 6/2018

OTHER PUBLICATIONS

NPL_Subpicosecond.pdf, Migus et al., Jan. 1982, IEEE Journal of Quantum Electronics, vol. QE-18, No. 1. (Year: 1982).*
(Continued)

*Primary Examiner* — Dana Ross
*Assistant Examiner* — Ket D Dang (57) ABSTRACT

Disclosed is a system for efficiently cutting a transparent substrate. The system includes a laser source in optical communication with at least one multi-foci optical system. The laser source outputs at least one optical signal to the optical system. The optical system is positioned between the laser source and the substrate to be cut. The optical system includes at least one housing detachably coupled to at least one base member. One or more plate members having one or more apertures formed therein may be coupled to at least one of the housing, the baser member, or both. The aperture formed on the plate member may be configured to permit the optical signal to enter and exit the optical system. Various optical subassemblies may be positioned within or coupled to the optical system.

18 Claims, 8 Drawing Sheets

Related U.S. Application Data (60) Provisional application No. 62/760,877, filed on Nov. 13, 2018.

(51) Int. Cl.
| | |
|---|---|
| *H01S 3/16* | (2006.01) |
| *H01S 3/067* | (2006.01) |
| *G02B 3/00* | (2006.01) |
| *C03B 33/08* | (2006.01) |
| *H01S 3/11* | (2006.01) |
| *B23K 26/00* | (2014.01) |
| *B23K 26/06* | (2014.01) |
| *H01S 3/00* | (2006.01) |

(52) U.S. Cl.
CPC ...... *B23K 26/0643* (2013.01); *B23K 26/0648* (2013.01); *B23K 26/0652* (2013.01); *C03B 33/082* (2013.01); *G02B 3/0087* (2013.01); *G02B 27/0927* (2013.01); *H01S 3/005* (2013.01); *H01S 3/06708* (2013.01); *H01S 3/11* (2013.01); *H01S 3/1611* (2013.01); *H01S 3/1643* (2013.01)

(58) Field of Classification Search
CPC ............. B23K 26/0652; C03B 33/082; G02B 3/0087; G02B 27/0927; H01S 3/005; H01S 3/06708; H01S 3/11; H01S 3/1611; H01S 3/1643
USPC ................ 219/121.6–121.62, 121.67–121.86; 359/350, 352, 355–357, 434–435, 483.01, 359/489.01, 489.07; 250/492.1–492.3
See application file for complete search history.

(56) References Cited

U.S. PATENT DOCUMENTS

| | | | |
|---|---|---|---|
| 2006/0289410 A1* | 12/2006 | Morita | B23K 26/03 219/121.67 |
| 2012/0223061 A1* | 9/2012 | Atsumi | B23K 26/0608 219/121.72 |
| 2018/0133837 A1* | 5/2018 | Greenberg | B23K 26/0006 |
| 2019/0030644 A1* | 1/2019 | Okuma | B23K 26/032 |

OTHER PUBLICATIONS

International search report of PCT Patent Application No. PCT/CN2019/117717 dated Feb. 7, 2020.

\* cited by examiner

LASER BASED SYSTEM FOR CUTTING TRANSPARENT AND SEMI-TRANSPARENT SUBSTRATES

CROSS-REFERENCE TO RELATED APPLICATIONS AND PRIORITY

The present application is a Continuation Application of PCT Application No. PCT/CN2019/117717 filed on Nov. 12, 2019, which claims priority from U.S. Application No. 62/760,877 filed on Nov. 13, 2018. All the above are hereby incorporated by reference.

TECHNICAL FIELD

The disclosed subject matter relates to a system for cutting substrates, more particularly the disclosed subject matter relates to a system for laser cutting transparent and semi-transparent substrates.

BACKGROUND

Transparent and semi-transparent substrates such as glass substrates are presently used in a vast number of applications. For example, most consumer electronics devices such as cellular phones, "smart" phones, tablet computers and the like include glass and/or glass-like substrates to protect display devices and the like. Further, electronic devices incorporating touch-screen technology displays are becoming commonplace. In addition, transparent and semi-transparent substrates such as various glasses are frequently used in aerospace applications, medical devices, manufacturing systems, and the like. As a result, glass substrates are presently manufactured in a wide variety of sizes and shapes with any variety of geometric features formed therein.

Currently, there are a number of processes used to manufacture glass substrates. For example, mechanical drilling, cutting, sand-blasting, and surface polishing are all processes used to some degree for fabricating various features in a glass substrate. While these mechanical processes have proven somewhat useful in the past, a number of shortcomings have been identified. For example, consumable materials are used in mechanical processing. As such, the cost of processing is somewhat variable depending on the cost of consumable materials. Further, mechanical processing may be a labor intensive, time consuming process.

Figure 1:
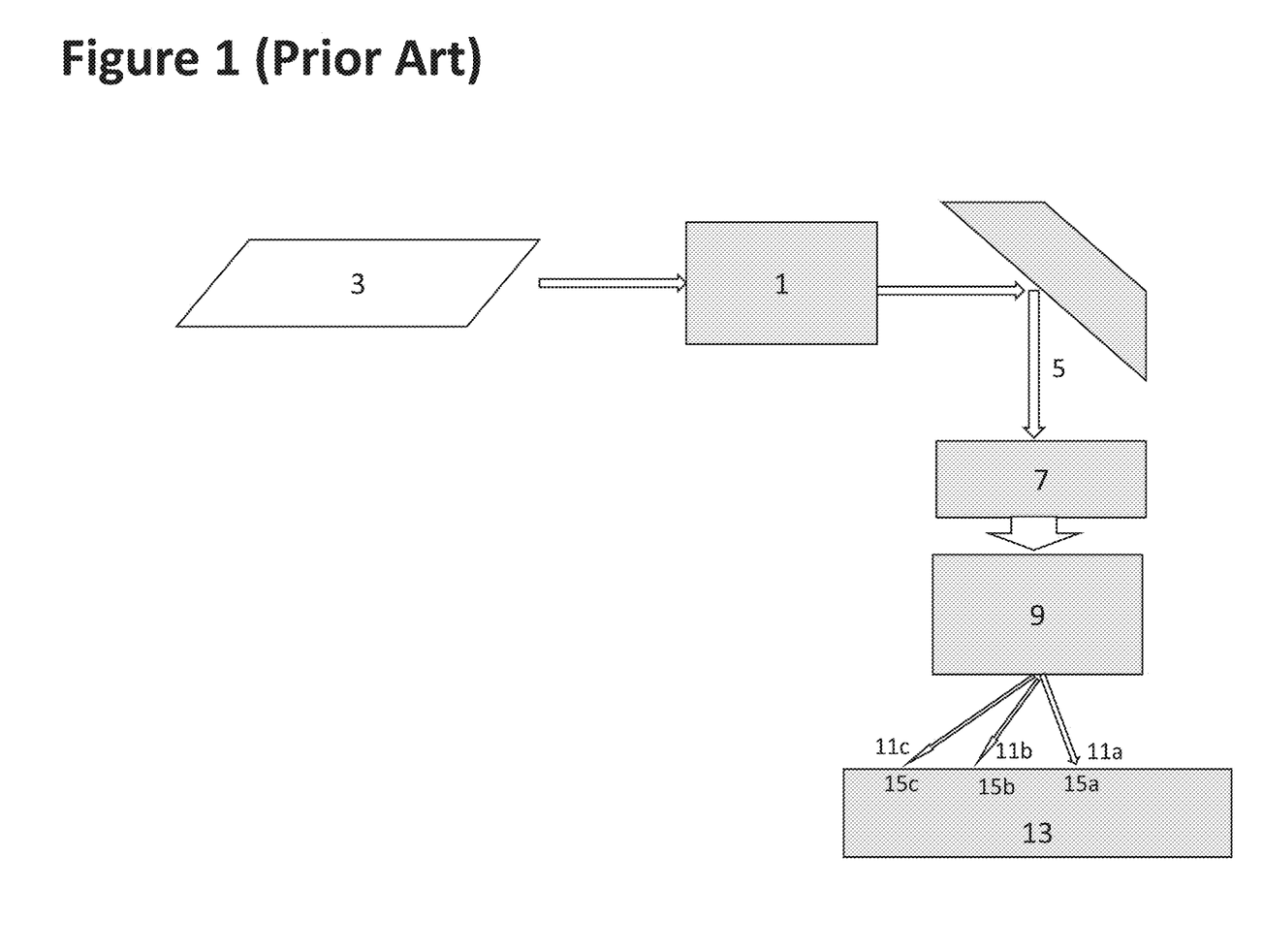
FIG. 1 is a schematic diagram of a prior art laser-based optical system used form processing glass or similar transparent or semi-transparent substrates.

Increasingly, however, laser-based optical systems are being used for processing glass or similar transparent or semi-transparent substrates. FIG. 1 shows a schematic diagram of a prior art laser-based optical system used form processing glass or similar transparent/semi-hz substrates. As shown, the laser-based optical system 1 includes a laser source 3 configured to output a laser signal 5. The laser signal 5 is directed to the substrate 13 by at least one beam director 7, which directs the laser signal 5 into a lateral distribution device 9. The lateral distribution device 9 is configured to form multiple laterally displaced output signals 11a, 11b, 11c, which are directed to the substrate 13. As a result, the laterally displaced output signals 11a, 11b, 11c form multiple laterally displaced processing areas 15a, 15b, 15c within the substrate 13. Once the multiple laterally displaced processing areas 15a, 15b, 15c are formed within the substrate 13 a separation force may be applied to the substrate 13 to separate the substrate 13 along a desired line. Unlike mechanical processes, the laser-based processing described above does not require the use of consumable materials. In addition, high-quality laser processed glass substrates require less post-processing (i.e. polishing, etc.) than mechanical processing.

While the laser-based optical systems being used for processing glass or similar transparent or semi-transparent substrates offer several advantages over mechanical glass cutting systems a number of shortcomings have been identified. For example, the formation of a single row of multiple laterally displaced processing areas 15a, 15b, and 15c within the substrate 13 may result in the separation line varying from the desired path. In addition, the formation of a single row of multiple laterally displaced processing areas 15a, 15b, and 15c with the substrate 13 may result in a less uniform separation edge thereby requiring post-processing.

Figure 2A:
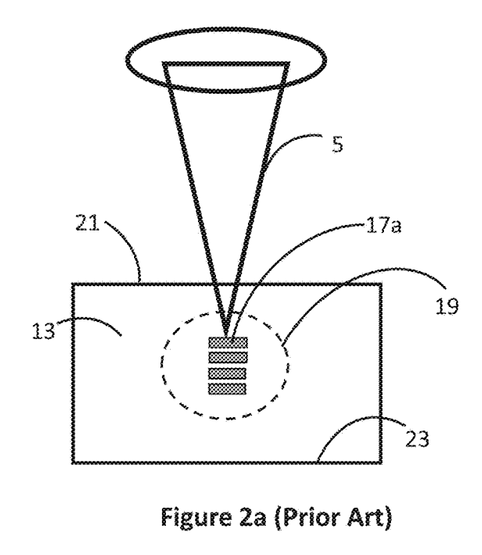
FIGS. 2a-2c illustrate that a laser-based optical system for glass processing may be configured to form multiple axially-displaced process areas within the substrate.
Figure 2B:
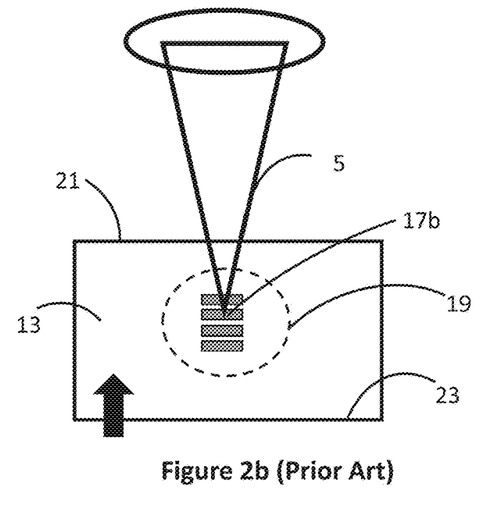
Figure 2C:
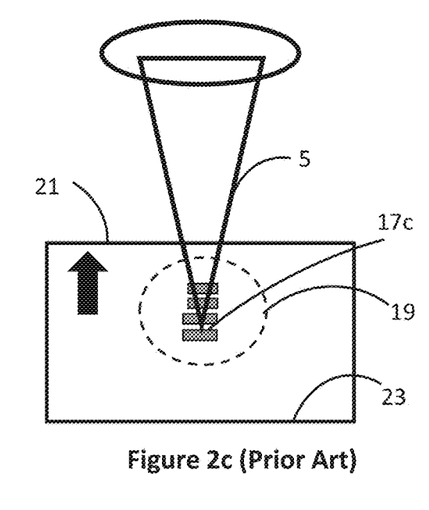
Figure 2D:
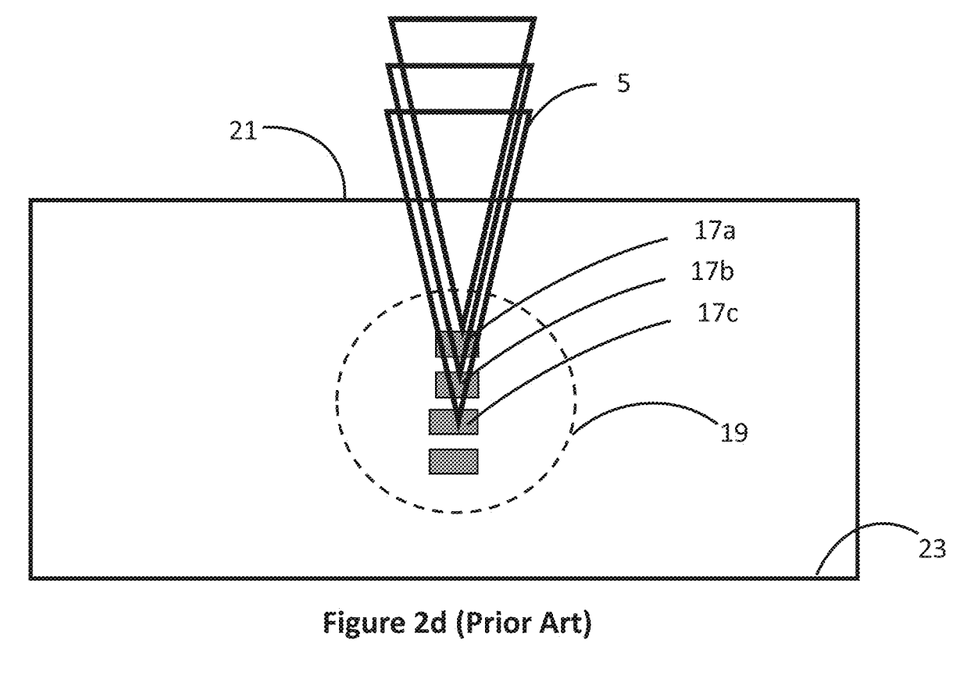
FIG. 2d illustrates multiple axially-displaced processing areas of a substrate.

Recently, several glass-cutting systems have been developed which form multiple axially-displaced processing areas within the substrate. As shown, in FIGS. 2a-2d, a laser-based optical system for glass processing may be configured to form multiple axially-displaced process areas within the substrate. As shown, the substrate 13 is subjected to an optical signal 5. Referring to FIG. 2a, the optical signal 5 is configured to form a first process area 17a within the body 19 of the substrate 13. As shown, the first process area 17a may be located proximate to the second surface 23 of the body 19. Thereafter, as shown in FIG. 2b, a second process area 17b axially-displaced from the first process area 17a may be formed at a medial point within the body 19. As shown in FIG. 2c, a third process area 17c axially-displaced from the second process area 17b may be proximate to the first surface 21 of the body 19. As shown in FIG. 2d, multiple axial processing areas 17a, 17b, 17c are formed within the body 19. As a result, separation of the glass substrate along the line of the multiple axially-displaced processing areas provides a more uniform edge requiring less post-processing the prior art methods. However, typically this process method requires sequentially focusing the optical signal 5 at various locations within the substrate 13 to form the various process areas, thereby increasing processing time. Further, precisely and repeatably positioning the multiple axially-displaced processing areas within the substrate has proven difficult.

In light of the foregoing, there is an ongoing need for a method and apparatus for effectively and efficiently cutting transparent and semi-transparent substrates in any variety of desired shapes.

SUMMARY

This summary is provided to introduce concepts related to system and method for prioritizing and scheduling notifications to a user on user's device and the concepts are further described in the detailed description. This summary is not intended to identify essential features of the claimed subject matter nor is it intended for use in determining or limiting the scope of the claimed subject matter.

In an implementation, a laser based system for cutting a substrate is disclosed. The system includes a laser source that is configured to output an optical signal. The system further includes an optical system that is in an optical communication with the at least one laser source. The optical system is positioned in between the at least one laser source and the substrate to be cut. The optical system receives the optical signal from the at least one laser source. There may be one or more filters, lenses, or other optical elements, placed in between the at least one laser source and the optical system, that may pre-condition or otherwise modify at least one optical characteristic of the optical signal. The optical system includes at least one base member coupled to at least one housing. The coupling may be detachable or non-detachable. The optical system further includes one or more plate members coupled to the at least one housing or the at least one base member, wherein the one or more plate members include one or more apertures configured to enter or exit the optical system. The optical system may further include at least one beam expander that is configured to collimate and/or expand diameter of the optical signal from the at least one laser source. Furthermore, the optical system includes at least one beam shaper configured to generate a high resolution uniform power distribution optical signal, one or more beam directors and at least one multi-zone lens assembly. The at least one multi-zone assembly is configured to focus the optical signal to multiple discreet locations on the substrate.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The present application is directed to a system for efficiently cutting a transparent material with a laser beam resulting in deterministic separation of a single sheet of the material into two or more pieces. While the description included herewith discusses cutting glass substrates, those skilled in the art will appreciate that any variety of transparent and semi-transparent substrates may be cut in any variety of shapes using the methods and devices described herein. Exemplary substrate materials include, without limitations, glass, strengthen glass, silica-based materials, ceramic polymers, polymeric materials and compounds, crystals, and the like. Moreover, the process and devices described herein may be used for straight line cuts and curved lines as well.

Figure 3:
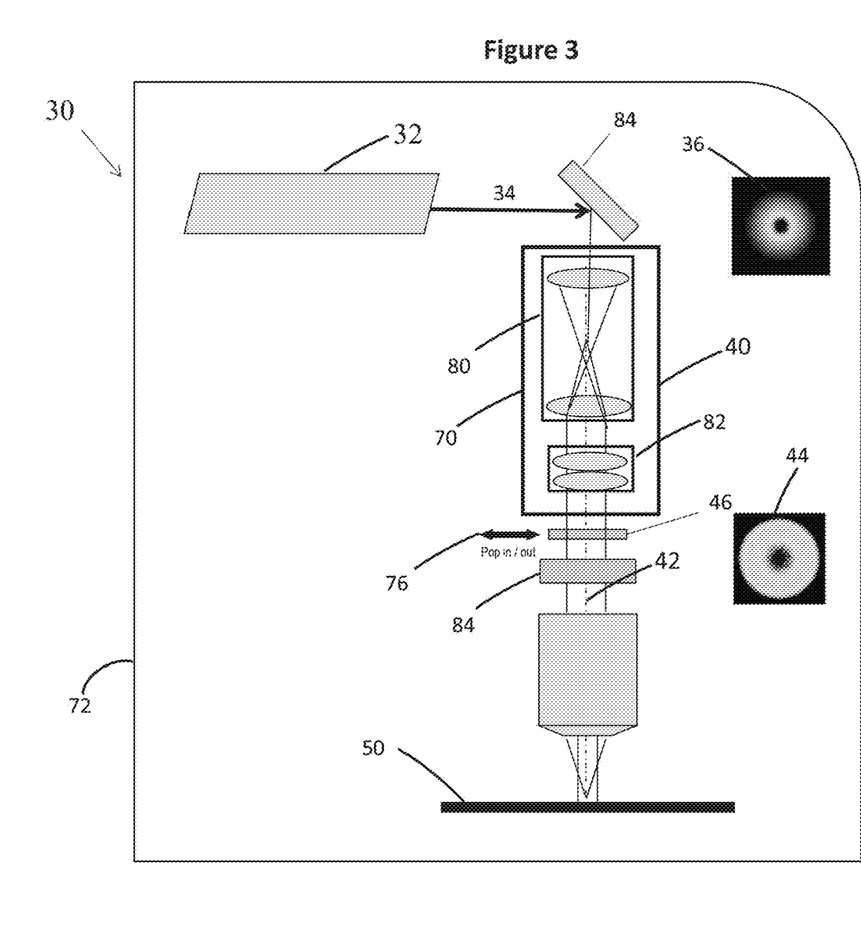
FIGS. 3-4 are schematic diagrams of an embodiment of an optical system for efficiently cutting a transparent substrate.

FIG. 3 illustrates a laser based system 30, in accordance with aspects of the embodiments. A schematic diagram of a laser based system 30 for cutting a substrate is illustrated. According to an embodiment of the invention the substrate may be a transparent or semi-transparent substrate.

The laser-based cutting system 30 includes at least one laser source 32 in optical communication with at least one multi-foci optical system 40. The optical system 40 is positioned in between the laser source 32 and the substrate 50. According to an embodiment of the invention, the optical system 40 includes at least one housing 70 detachably coupled to at least one base member 72. In an alternate embodiment, the housing 70 may be non-detachably coupled to the base member 72. One or more plate members 74 having one or more apertures 76 formed therein may be coupled to at least one of the housing 70, the baser member 72, or both. The aperture 76 formed on the plate member 74 may be configured to permit the optical signal 34 to enter the optical system 40. Further, the aperture 76 may permit the output signal 42 to exit the optical system 40.

According to an embodiment of the invention, the laser source 32 comprises a q-switched Nd:YAG laser configured to output an optical signal having a wavelength within a range of about 1064 nm. In another embodiment of the invention, the laser source 32 comprises a pulsed ultrafast laser system. In another embodiment of the invention, the laser source 32 may comprise a picosecond laser source. In another embodiment of the invention, the laser source 32 comprises a sub-picosecond laser source. Alternatively, in another embodiment of the invention, the laser source 32 comprises a fiber laser or fiber amplifier. Those skilled in the art will appreciate that any variety of laser sources may be used with the present system, including, without limitations, excimer lasers, CO2 lasers, optical parametric oscillators (OPAs), semiconductor lasers, solid state lasers, and the like. Further, in the illustrated embodiment a single laser source is used. Those skilled in the art will appreciate that any number of laser sources may be utilized.

According to yet another embodiment of the invention, the optical signal 34 has a Gaussian beam profile 36, typical of the output of a laser system, particularly a Nd:YAG laser system. The optical signal 34 is directed in the optical system 40. Optionally, one or more filters, lenses, or other optical elements may pre-condition or otherwise modify at least one optical characteristic of the optical signal 34. For example, one or more filters, choppers, q-switches, modulators, and the like may be used to pre-condition the optical signal 34 prior to entering the optical system 40.

Figure 4:
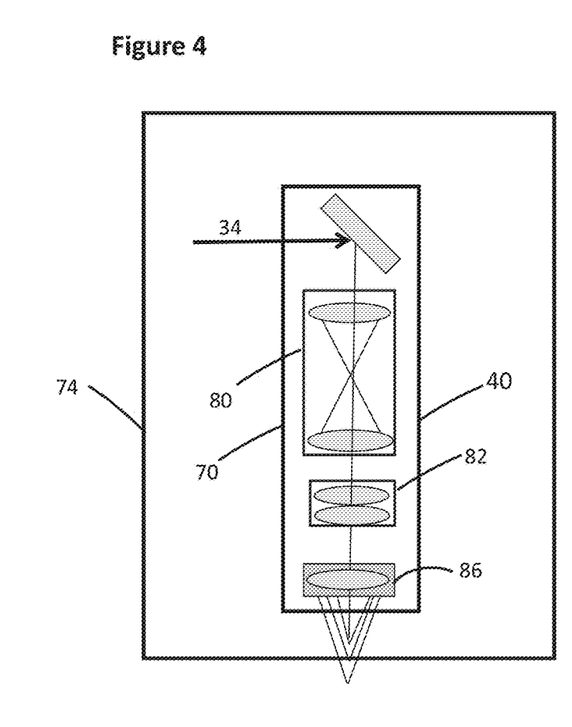

Furthermore, in yet various optical subassemblies may be positioned within, according to an embodiment of the invention, or coupled to the optical system 40, in accordance to an alternate embodiment of the invention, as depicted by FIGS. 3 and 4. For example, as shown in FIGS. 3-4, at least one beam expander assembly 80 may be positioned within the housing 70 of the optical system 40. In one embodiment the beam expander assembly 80 may be configured to collimate and/or expand the beam diameter of the optical signal 34. As such, the beam expander assembly 80 may include any variety of lenses, lens assemblies, gratings, mirrors, filters, and the like. For example, in one embodiment, the beam expander assembly 80 is configured to increase the diameter of the optical signal 34 to a pre-determined beam diameter. In another embodiment of the invention, the beam expander assembly 80 is configured to selectively increase the diameter of the optical signal 34 to a variable beam diameter.

Additionally, one or more filters, lenses, or other optical elements may be placed in between the laser source 32 and the optical system 40 to pre-condition or otherwise modify at least one optical characteristic of the optical signal 34. For example, one or more filters, choppers, q-switches, modulators, and the like may be used to pre-condition the optical signal 34 prior to entering the optical system 40.

As depicted by FIGS. 3-4, at least one beam shaper assembly 82 may be positioned within the housing 70 of the optical system 40. In one embodiment of the invention, the beam shaper assembly 82 may be configured to generate a high resolution, uniform power distribution optical signal having a flat-top profile 44 from the optical signal 34 having a Gaussian profile 36 generated by the laser source 32. As such, the beam shaper assembly 82 may include any variety of lenses, lens assemblies, gratings, mirrors, filters, and the like.

As shown in FIGS. 3-4, the optical system 40 may include one or more beam directors 84 therein. According to an embodiment of the invention, the beam directors 84 include, without limiting the scope of the invention mirrors, gratings, and the like. In addition to this according to another embodiment of the invention, at least one multi-zone lens assembly 86 may be positioned within the optical system 40. In one embodiment, the multi-zone lens assembly 86 may include one or more optical components configured to focus an optical signal to multiple discreet locations of the substrate 50. In one embodiment, multi-zone lens assembly 86 includes at least one gradient index lens. In the alternative, the multi-zone lens assembly 86 may include one or more additional optical elements including, without limitations, aspheric lenses, zone plates, Fresnel lenses and plates, lens systems, and the like.

According to an embodiment of the invention, as depicted by FIG. 3, at least one optical element 46 may be positioned outside the optical system 40. For example, the optical element 46 may comprise at least one objective lens or lens system. In the alternative, the optical element 46 may comprise one or more sensors, cameras, filters, mirrors, positioning systems, and the like.

Figure 5A:
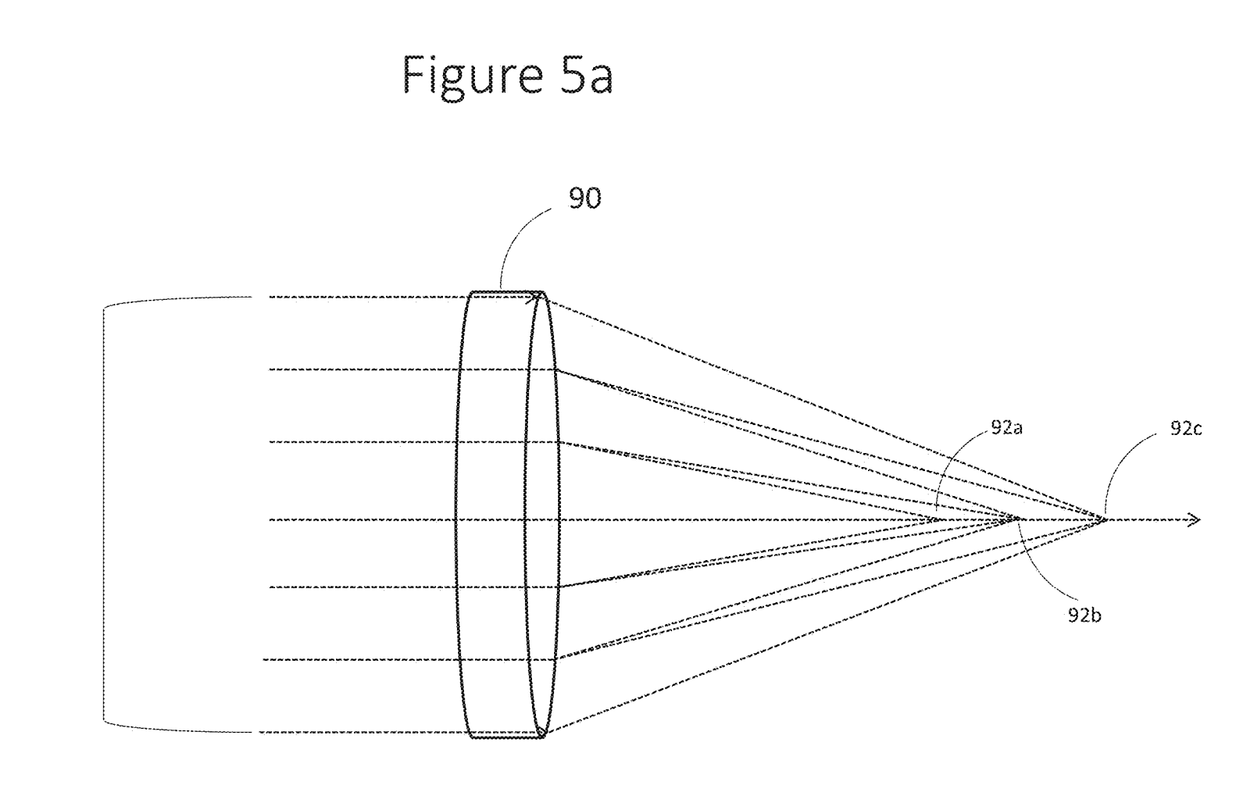
FIG. 5a illustrates a multi-foci lens in GRIN lens profile.

Now referring to FIG. 5a, that displays a multi-foci lens in a gradient lens index (GRIN lens) profile. gradient index lens 90 which may be used in an embodiment of the multi-zone lens assembly 86. The gradient index lens 90 may be configured to focus the incoming optical signal to a first focal zone 92a, second focal zone 92b, and at least a third focal zone 92c.

Figure 5B:
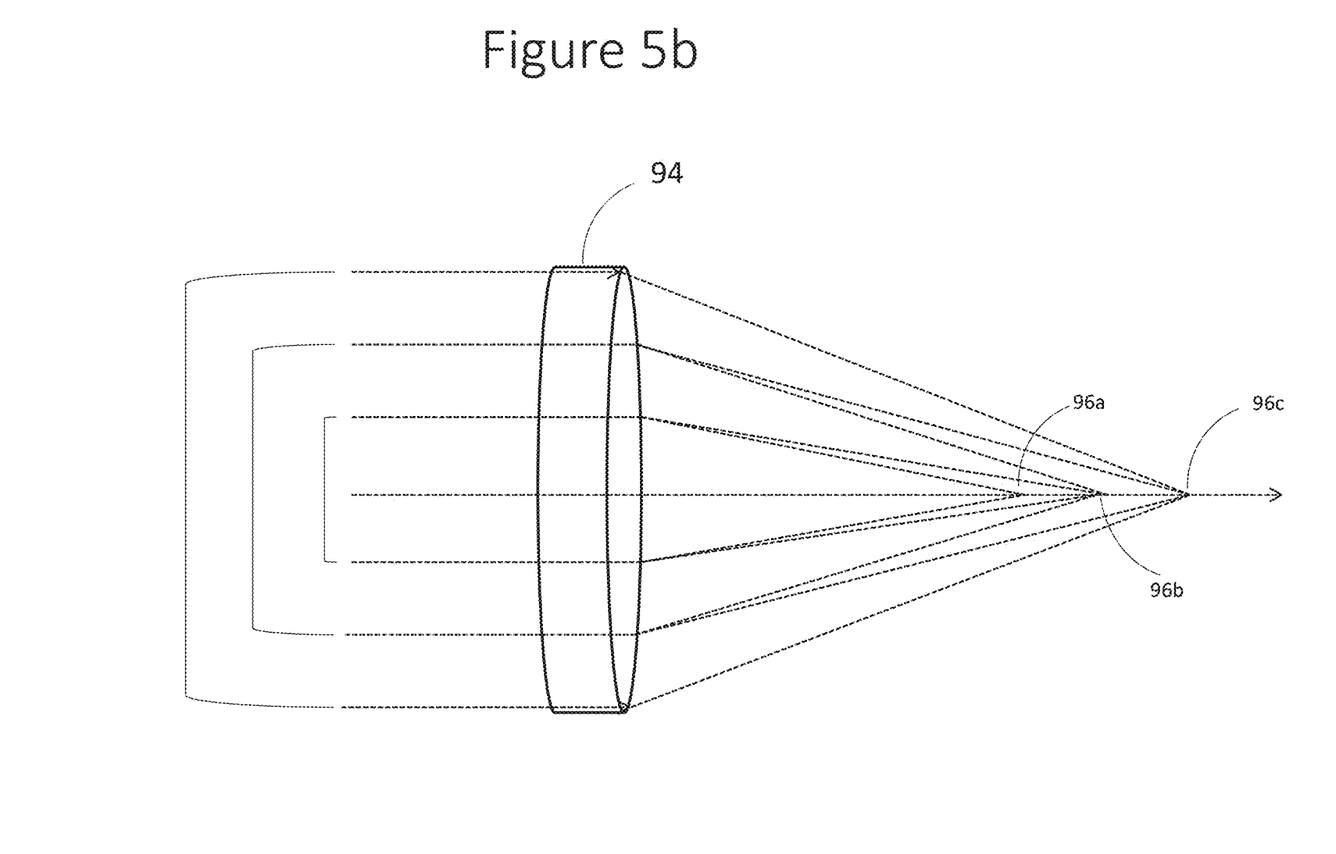
FIG. 5b illustrates a multi-foci lens in multiple radii of curvature.

Now referring to FIG. 5b, that, FIG. 5b, depicts a multi-foci lens in multiple radii of curvature. As depicted in the figure, the lens 94 includes zones configured to focus the incoming optical signal to a first focal zone 96a, second focal zone 96b, and at least a third focal zone 96c.

Figure 6:
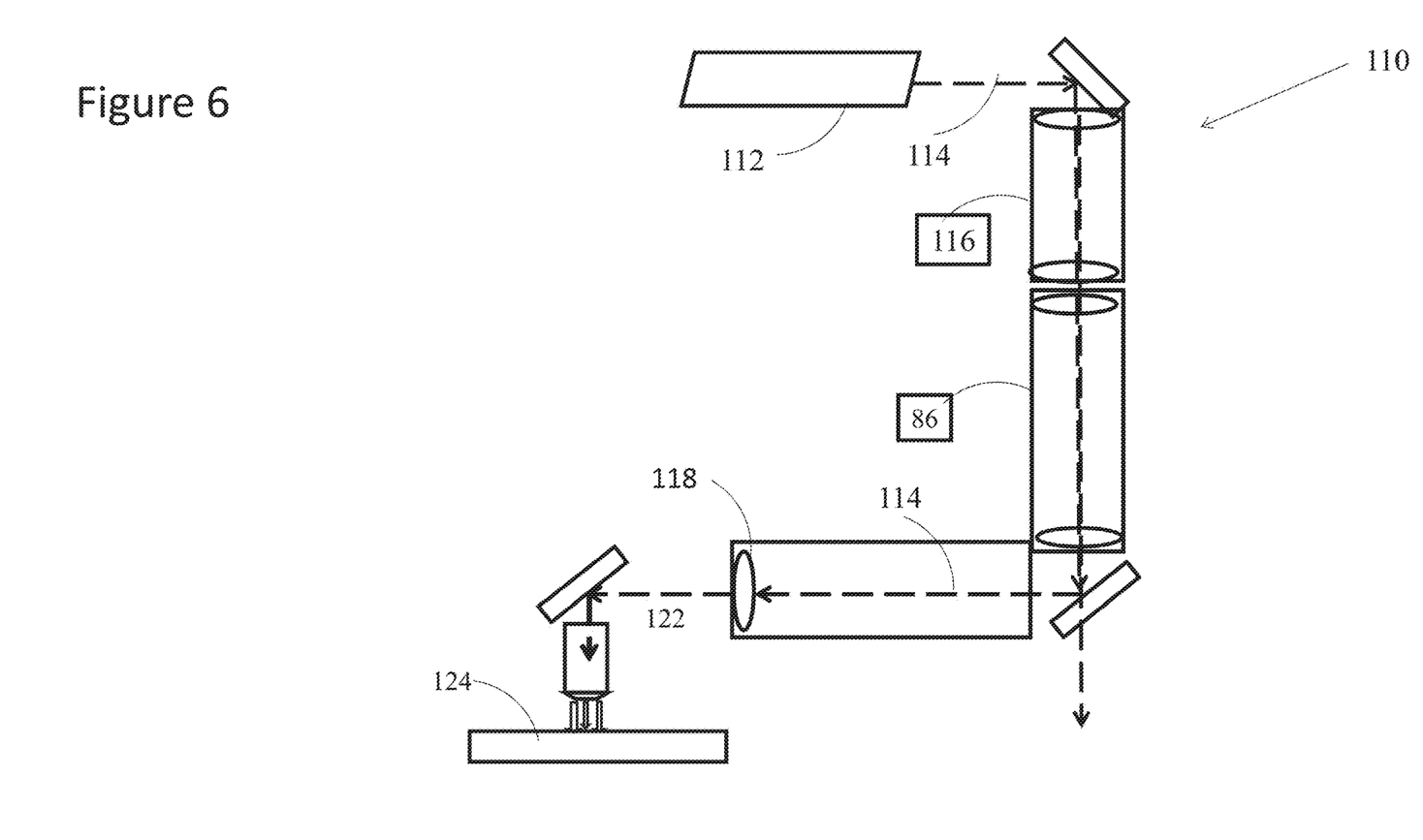
FIG. 6 illustrates an optical system, according to another embodiment of the invention.

Now referring to FIG. 6, illustrating a laser based cutting system 110 for cutting substrates, according to another embodiment of the invention. The embodiment is similar in structure described with the previous embodiment of the optical system 30. The optical system 110 may include a laser source 112 configured to output at least one optical signal 114, which is directed into at least one optical system 116. As in the previous embodiment, as described above, the optical system 116 is configured to output at least one multi-zone optical signal 118 configured to form multiple axially-displaced processing areas within the substrate 124. Further, the multi-zone optical signal may be directed into at least one beam splitter or similar device configured to output multiple laterally displaced output signals 122, each output signal 122 configured to form multiple axially-displaced processing areas within the substrate 124.

Figure 7:
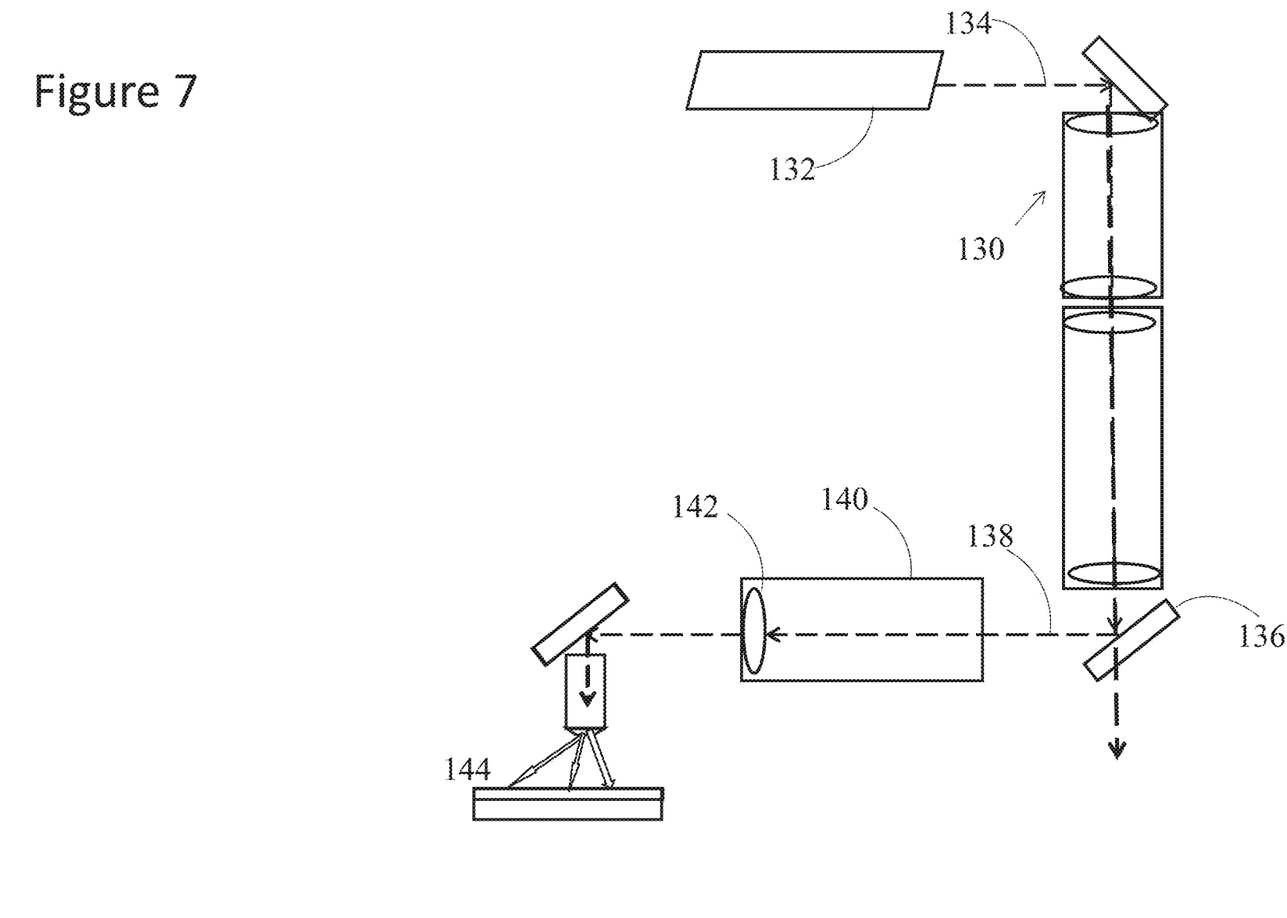
FIG. 7 illustrates an optical system, according to yet another embodiment of the invention.

Referring now to FIG. 7, illustrating yet another embodiment of laser based cutting system 130 to be utilized for cutting substrates. As mentioned before, the substrate can be either transparent or semi-transparent. Similar to previous embodiment of the optical system 40, as depicted by FIGS. 3-4, the optical system 130 includes a laser source 132 configured to output at least one optical signal 134, which is directed into at least one beam splitter 136 or a similar device. The beam splitter 136 is configured to output a plurality of laterally-displaced optical signals 138. At least one laterally-displaced optical signal 138, of the plurality of optical signals may be directed into the optical system 140. The optical system 140 is configured to output at least one multi-zone optical signal 142 configured to form multiple axially-displaced processing areas within the substrate 144.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A laser based system for cutting a substrate comprising;
   at least one laser source configured to output an optical signal;
   at least one optical system in optical communication with the at least one laser source, wherein the at least one optical system is positioned between the at least one laser source and the substrate, wherein the at least one optical system comprises;
   at least one base member;

at least one housing coupled to the at least one base member;

one or more plate members coupled to the at least one housing or the at least one base member, wherein the one or more plate members include one or more apertures configured to enter or exit the at least one optical system;

at least one beam expander configured to collimate and/or expand diameter of the optical signal;

at least one beam shaper configured to generate a high resolution uniform power distribution optical signal;

one or more beam directors;

at least one multi-zone lens assembly configured to focus the optical signal; and wherein the at least one optical system is configured to output at least one multi-zone optical signal, wherein further the at least one multi-zone optical signal is configured to output multiple laterally-displaced output signals, wherein each of the multiple laterally-displaced output signals is further configured to form multiple axially-displaced processing areas on the substrate.

2. The system of claim 1, wherein the at least one laser source comprises a q-switched Nd:YAG laser.

3. The system of claim 2, wherein the at least one laser source is configured to output the optical signal having a wavelength of about 1064 nm.

4. The system of claim 1, wherein the at least one laser source further comprises a pulsed ultrafast laser system.

5. The system of claim 1, wherein the at least one laser source further comprises a picosecond laser source.

6. The system of claim 1, wherein the at least one laser source further comprises a sub-picosecond laser source.

7. The system of claim 1, wherein the at least one laser source further comprises a fiber laser or fiber amplifier.

8. The system of claim 1, wherein the at least one housing is detachably coupled to the at least one base member.

9. The system of claim 1, wherein the at least one housing is non-detachably coupled to the at least one base member.

10. The system of claim 1, wherein the at least one beam expander includes lenses, lens assemblies, gratings, mirrors, and filters.

11. The system of claim 1, wherein the at least one beam expander is configured to increase the diameter of the optical signal to a pre-determined beam diameter.

12. The system of claim 1, wherein the at least one beam expander is configured to selectively increase the diameter of the optical signal to a variable beam diameter.

13. The system of claim 1, wherein the beam shaper assembly is configured to generate the high resolution and uniform power distribution optical signal having a flat-top profile.

14. The system of claim 1, wherein the multi-zone lens assembly includes at least one gradient index lens.

15. The system of claim 14, wherein the at least one gradient index lens is configured to focus the optical signal to a first focal zone, second focal zone, and at least a third focal zone.

16. The system of claim 14, wherein the at least one gradient index lens has multiple radii of curvature.

17. The system of claim 1, wherein the substrate is a transparent or semi-transparent substrates.

18. The system of claim 1, wherein the system further comprising a beam splitter configured to output the multiple laterally-displaced output signals.

\* \* \* \* \*